Dec. 29, 1931.   V. BENDIX ET AL   1,838,131

BRAKE

Filed Aug. 1, 1928

INVENTORS
Vincent Bendix
Ludger E. LaBrie

ATTORNEY

Patented Dec. 29, 1931

1,838,131

UNITED STATES PATENT OFFICE

VINCENT BENDIX, OF CHICAGO, ILLINOIS, AND LUDGER E. LA BRIE, OF SOUTH BEND, INDIANA, ASSIGNORS TO BENDIX BRAKE COMPANY, OF SOUTH BEND, INDIANA, A CORPORATION OF ILLINOIS

BRAKE

Application filed August 1, 1928. Serial No. 296,754.

This invention relates to brakes, and is illustrated as embodied in an internal expanding brake for an automobile. An object of the invention is to provide a very powerful brake, preferably in both forward and reverse directions of operation, without undue complication and in a manner permitting economical manufacture.

In one desirable arrangement, there is a floating device, shown as including a pair of pivotally-connected shoes, and which is arranged to anchor at one end when the drum is turning in one direction and at the other end when the drum is turning in the other direction. This device, according to an important feature of the invention, is operated by a novel servo shoe acting through simplified connections such as pivoted levers, engaged by opposite ends of the servo shoe and having a camming action on opposite ends of the floating friction device. The servo shoe, and the connections through which it operates, also embody substantial novelty of construction in and of themselves.

The above and other objects and features of the invention, including various novel and desirable details of construction and arrangement, will be apparent from the embodiment shown in the accompanying drawings, in which.

Figure 1:
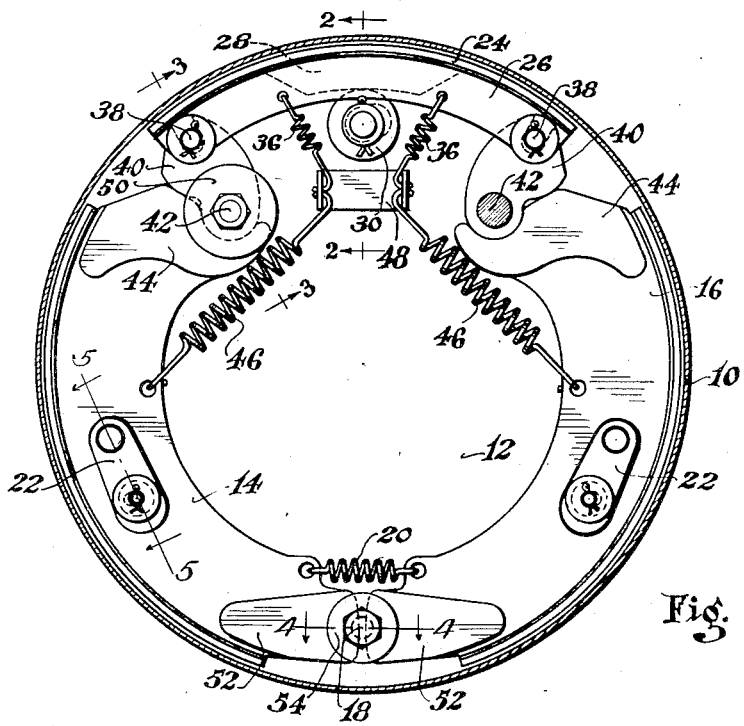
Figure 1 is a vertical section through the brake, just inside the head of the brake drum, and showing the brake shoes in side elevation.
Figure 2:
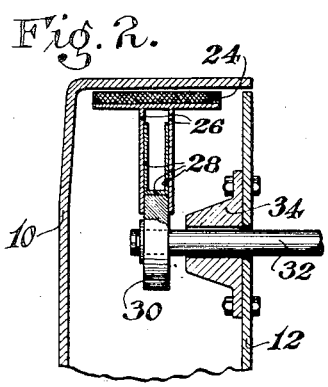
Figure 2 is a radial section through the servo shoe and operating means therefor taken on the line 2—2 of Figure 1.
Figure 3:
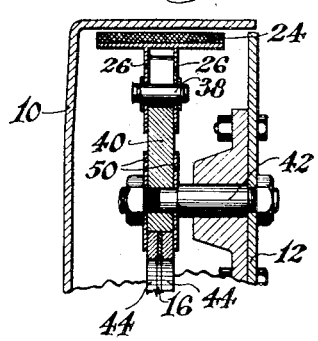
Figure 3 is a radial section on the line 3—3 of Figure 1, showing one of the devices through which the servo shoe operates the main friction means.
Figure 5:
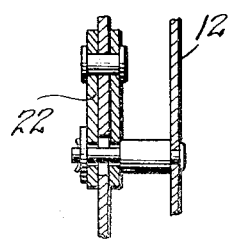
Figure 5 is a section on the line 5—5 of Figure 1 showing the stop for determining the idle position of the brake shoes.
Figure 4:
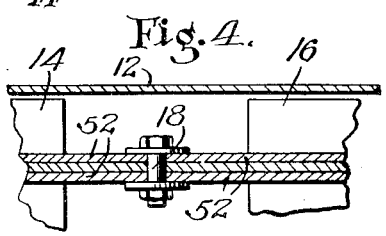
Figure 4 is a section through the floating pivot taken on the line 4—4 of Figure 1.

The illustrated brake includes a rotatable brake drum 10, at the open side of which is a suitable support such as a backing plate 12, and within which is the brake friction means.

The friction means preferably includes a floating device anchoring at one end when the drum is turning in one direction and at the other end when the drum is turning in the other direction, and shown as including a pair of interchangeable shoes 14 and 16, connected by a floating pivot or bolt 18 against which the socketed lower ends of the shoes are held by means such as a coil spring 20 tensioned between the shoes. Suitable positioning devices 22 of any desired character may be provided for determining the positions of the shoes when the brake is released.

Between the upper ends of shoes 14 and 16 is arranged a servo shoe 24, shown with spaced parallel webs 26 between which is a hardened stamped U-section thrust plate 28 engaged by a roller 30 mounted on an eccentric portion at the end of a brake camshaft 32 journaled in a bracket 34 carried by the backing plate 12. Turning shaft 32 forces the servo shoe 24 against the drum, against the resistance of return springs 36, to apply the brake, whereupon the servo shoe tends to turn in one direction or the other with the drum.

At its opposite ends, the servo shoe 24 is connected by means such as pivots 38 to applying devices such as levers 40 mounted on fixed fulcrums 42 carried by the backing plate 12. Pivots 38 may pass through slots or notches in the outer ends of levers 40, so that the shoe 24 is not at anytime pulled away from the drum by the levers. Shoes 14 and 16 are formed at their upper ends with rounded recesses within which rounded portions of the inner ends of levers 40 are adapted to fit, which portions thus serve as part of the anchoring means to transmit the braking torque to one or the other of the fulcrums or posts 42.

The shoe ends may be reinforced by steel plates or stampings 44 projection-welded to their opposite sides. The shoes 14 and 16 are normally held in released positions by return springs 46, these springs and springs 36 all being shown attached to a stamping 48 secured to the backing plate 12. Fulcrums or anchor posts 42 are shown provided with washers 50 to confine the shoe ends laterally.

The lower ends of the shoes may also be reinforced by plates 52 projection-welded to their sides; pivot 18 having washers 54 confining the shoe ends laterally.

In operation if the drum is turning clockwise, when shoe 24 engages the drum, shoe 24 moves to the right and operates lever 40 with a camming action to force shoe 16 away from its anchorage to complete the application of the brake, shoe 14 remaining anchored against its lever 40, which is turning away from the shoe at that time. If the drum is turning counter-clockwise, shoe 14 is forced away from its anchorage and shoe 16 remains anchored.

While one illustrative embodiment has been described in detail, it is not our intention to limit the scope of the invention to that particular embodiment, or otherwise than by the terms of the appended claims.

We claim:

1. A brake comprising, in combination, a drum, a floating friction device within the drum, a floating servo shoe arranged between the ends of the device, and two applying devices, one connected to each end of the servo shoe and acting on the corresponding end of the friction device one serving as an anchor when the drum is turning in one direction and the other as an anchor when the drum is rotating in the other direction.

2. A brake comprising, in combination, a drum, a friction device within the drum, a floating servo shoe arranged between the ends of the device, and two applying devices, one connected to each end of the servo shoe and acting on the corresponding end of the friction device, said friction device anchoring against one or the other of the applying devices according to the direction of drum rotation.

3. A brake comprising, in combination, a drum, a floating friction device within the drum, a floating servo shoe arranged between said ends of the device, and applying levers pivoted respectively to the opposite ends of the servo shoe and acting on the corresponding ends of the friction device and serving as anchors for the friction device.

4. A brake comprising, in combination, a drum, a floating friction device within the drum, a floating servo shoe arranged between the ends of the device, and two applying devices, one connected to each end of the servo shoe adapted to act on the corresponding end of the friction device and to serve as an anchor therefor, together with an applying device acting on the servo shoe between said two applying devices at the ends of the servo shoe.

5. A brake comprising, in combination, a drum, a floating friction device within the drum, a floating servo shoe arranged between the ends of the device, and applying levers pivoted respectively to the opposite ends of the servo shoe adapted to act on the corresponding ends of the friction device and to serve as anchors therefor, together with an applying device acting on the servo shoe between said two applying levers at the ends of the servo shoe.

6. A brake comprising, in combination, a friction device, a lever pivoted at one end and having between its ends a camming engagement with the friction device, and a servo shoe pivoted to the other end of said lever.

7. A brake comprising, in combination, a friction device, a lever pivoted at one end and having between its ends a camming engagement with the friction device, and a servo shoe acting on the other end of said lever.

8. A brake comprising, in combination, a friction device, a lever pivoted at one end and having between its ends a camming engagement with the friction device, and a servo shoe pivoted to the other end of said lever, said pivoted end of the lever being arranged to take the torque of the friction device.

9. A brake comprising, in combination, a friction device, a lever pivoted at one end and having between its ends a camming engagement with the friction device, and a servo shoe acting on the other end of said lever, said pivoted end of the lever being arranged to take the torque of the friction device.

10. A brake shoe comprising spaced webs, with a U-section thrust member secured between said webs facing inwardly.

In testimony whereof, we have hereunto signed our names.

VINCENT BENDIX.
LUDGER E. LA BRIE.